United States Patent [19]

Ozaki et al.

[11] Patent Number: 5,422,773
[45] Date of Patent: Jun. 6, 1995

[54] LID ASSEMBLY FOR A TAPE CASSETTE WHICH PROTECTS FRONT AND REAR SURFACES OF A MAGNETIC TAPE

[75] Inventors: Hiroshi Ozaki; Yuji Iwahashi, both of Miyagi, Japan

[73] Assignee: Sony Corporation, Tokyo, Japan

[21] Appl. No.: 200,736

[22] Filed: Feb. 23, 1994

[30] Foreign Application Priority Data

Feb. 26, 1993 [JP] Japan .................................. 5-038781

[51] Int. Cl.⁶ ..................... G11B 23/02; G11B 23/087
[52] U.S. Cl. .................................. 360/132; 242/347.1
[58] Field of Search ................. 360/132, 85; 242/347, 242/347.1, 347.2

[56] References Cited

U.S. PATENT DOCUMENTS

| | | | |
|---|---|---|---|
| 4,418,373 | 11/1983 | Fujimori et al. | 242/347.1 |
| 4,680,660 | 7/1987 | Ueda | 242/347.1 |
| 4,897,751 | 1/1990 | Goto | 360/132 |
| 5,065,955 | 11/1991 | Fujii | 360/132 |
| 5,225,954 | 7/1993 | Kondo | 360/85 |
| 5,316,234 | 5/1994 | Housho et al. | 242/347.1 |
| 5,322,237 | 6/1994 | Ota et al. | 242/347.1 |

Primary Examiner—A. J. Heinz
Assistant Examiner—Brian E. Miller
Attorney, Agent, or Firm—William S. Frommer; Alvin Sinderbrand

[57] ABSTRACT

In order to prevent drop-out in recording and reproducing, a cassette back lid is constituted by a first swing plate having a first engagement member engageable with a first cam surface, and a second swing plate having a second engagement member engageable with a second cam surface. The first swing plate is urged by torsion springs, in the lid opening direction. Therefore, a rotational operation of a cassette front lid in the lid opening direction causes the first swing plate to swing in the lid opening direction, and the second swing plate to swing in the lid opening direction, independently of the swing motion of the first swing plate, that is, the first and second swing plates swing relative to each other and also relative to the front lid in response to the swinging movements of the front lid between its opened and closed positions. This arrangement makes it possible to add the cassette back lid behind the front lid without changing the conventional open angle, and to improve the ability of protecting the tape.

13 Claims, 12 Drawing Sheets

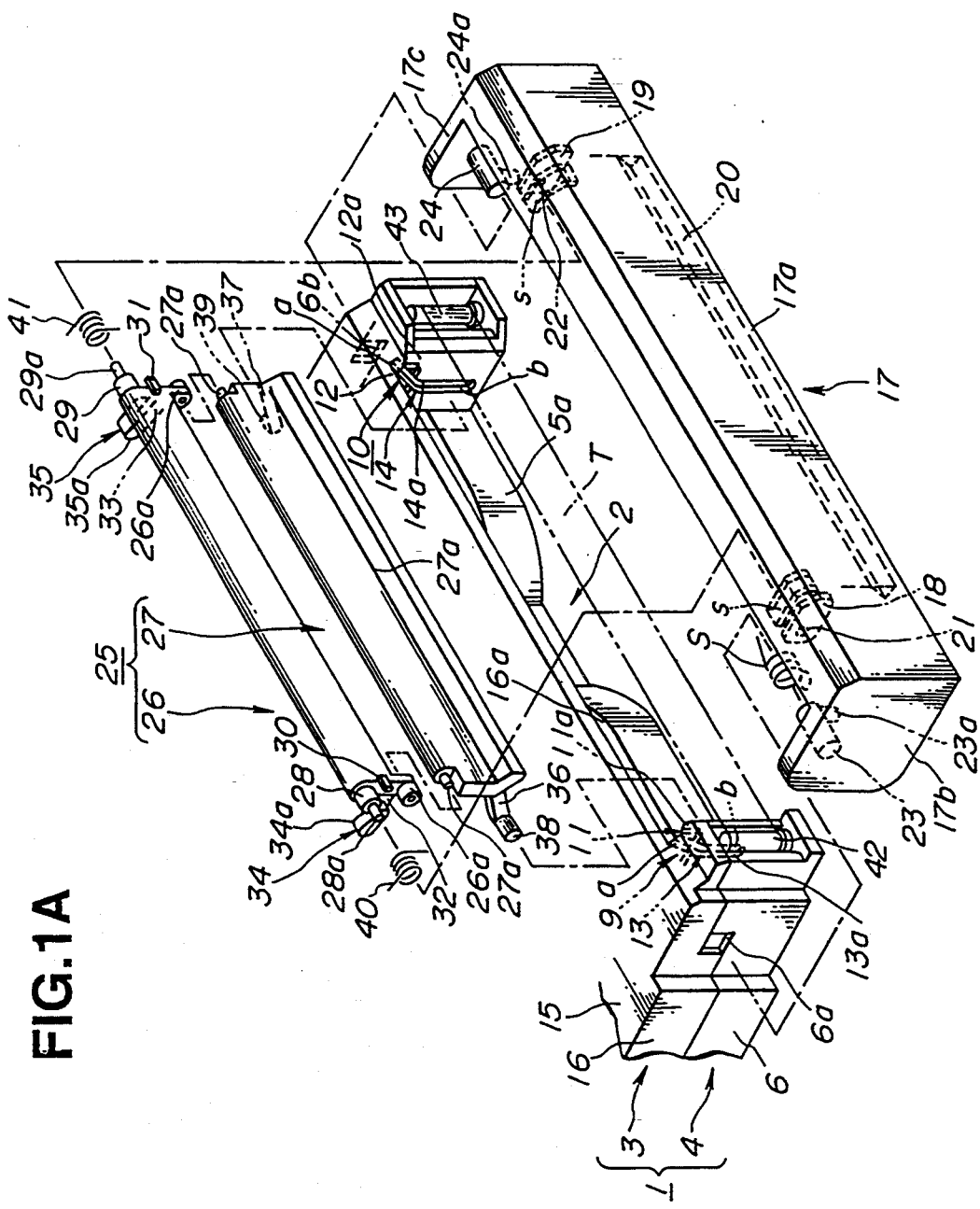

LID ASSEMBLY FOR A TAPE CASSETTE WHICH PROTECTS FRONT AND REAR SURFACES OF A MAGNETIC TAPE

BACKGROUND OF THE INVENTION

The present invention relates to a tape cassette suitable for use in record reproducing equipment such as video tape recorders, and other information processing equipment.

A conventional tape cassette includes a cassette shell (or case) having an interior space receiving tape reels and a tape inlet and outlet opening receiving a part of a magnetic tape, and a cassette lid which is rotatably mounted on the cassette shell and which covers the front side of the tape in the closed state.

In the thus-constructed tape cassette, tape loading is performed by insertion into a video tape recorder (or a video cassette recorder, VCR). When the cassette is inserted into the video tape recorder, a tape loading guide comes into the tape inlet and outlet opening from below, and then moves out of the tape inlet and outlet opening to draw the tape out of the cassette shell so that the tape loading operation can be carried out.

In this case, an opening lever of the tape recorder pushes the lid upward from below, and applies a rotational force in the lid opening direction to the cassette lid.

Recently, there has been proposed a tape cassette having a back lid covering the back side of the tape in addition to a front lid covering the front side of the tape, in order to improve the protection of the tape. One example is disclosed in U.S. Pat. No. 4,418,373.

In the conventional tape cassette of the single lid type having no back lid, however, the rotational angle of the cassette lid is set at a relatively small angle because a sufficient space for tape loading is obtained even if the open angle of the lid is small. Accordingly, it is not possible to add another (back) lid for covering the back side of the tape behind the (front) lid covering the front side of the tape without changing the conventional open angle. The back lid, if interposed without changing the open angle of the front lid, would come in contact with the tape in the tape inlet and outlet opening during the lid opening operation, disturbing the tape loading. As a result, the conventional tape cassette can not improve the tape protecting ability, and tends to suffer drop-out in recording and reproducing.

SUMMARY OF THE INVENTION

It is therefore an object of the present invention to provide a tape cassette which can improve the tape protecting ability and hence prevent drop-out in recording and reproducing.

A tape cassette according to the present invention, comprises a case, and front and back lids.

The case is provided with an opening in the front side thereof.

A tape medium is contained in the case, and the tape extends along the opening of the case.

The front lid is mounted on the case in such a manner that the front lid is movable, relative to the case, between a closed position for covering the opening in front of the tape medium and an opened position for exposing the opening and the front of said tape medium.

The back lid is movable with the front lid and is positioned behind the tape medium to enclose the tape medium between the back lid and the front lid when the front lid is in the closed position. The back of the tape medium is exposed when the front lid is in the opened position. The back lid comprises a first plate (or first swing portion) pivotally supported on the front lid and a second plate (or second swing portion) swingably supported on the first plate.

In accordance with the present invention, a rotational operation of the cassette front lid in the lid opening direction causes the first and second plates of the back lid to swing individually, that is, relative to each other and also relative to the front lid, in the lid opening direction within a narrow space without interfering with the tape medium.

BRIEF DESCRIPTION OF THE DRAWINGS

FIG. 1A is an exploded perspective view showing a main portion of a tape cassette according to a first embodiment of the present invention.

DETAILED DESCRIPTION OF THE INVENTION

FIGS. 1A~9 show a first practical example of the present invention.

A tape cassette (or tape cartridge) shown in FIG. 1 includes a case (or cassette shell) 1 which is substantially in the form of a rectangular flat case or a parallelepiped (or cuboid). The longest dimension of the case 1 is along the cassette widthwise direction from the left side to the right side, and the height of the case 1 from the bottom to the top is the shortest dimension. The dimension along the front and rear direction is intermediate. The case 1 has a tape reel chamber (interior space) 1a (FIG. 2A) for containing tape reels, and a front opening (or mouth) 2 which is open in the front side of the case. A tape (or tape medium) T is stretched across the front opening 2 along a straight path extending substantially in parallel to the widthwise direction. The case 1 is made up of upper and lower shells (halves) 3 and 4 which are joined.

Figure 1B:
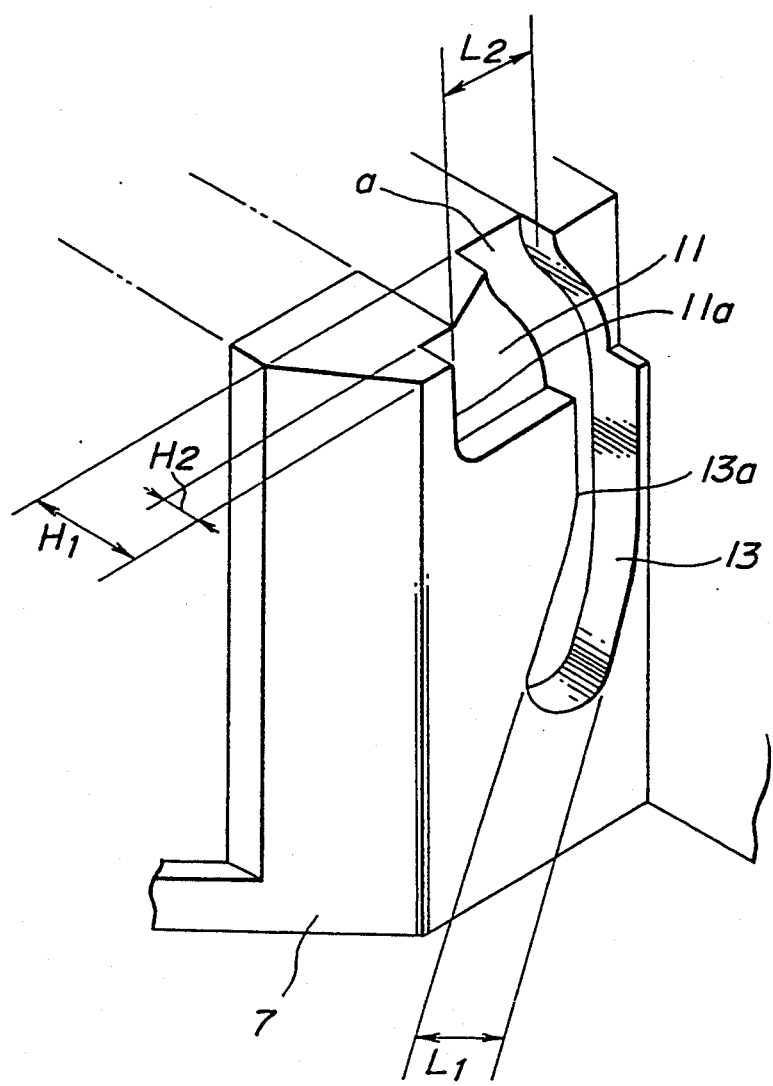
FIG. 1B is a perspective view for showing one of cam arrangements formed in the cassette shown in FIG. 1A.
Figure 2A:
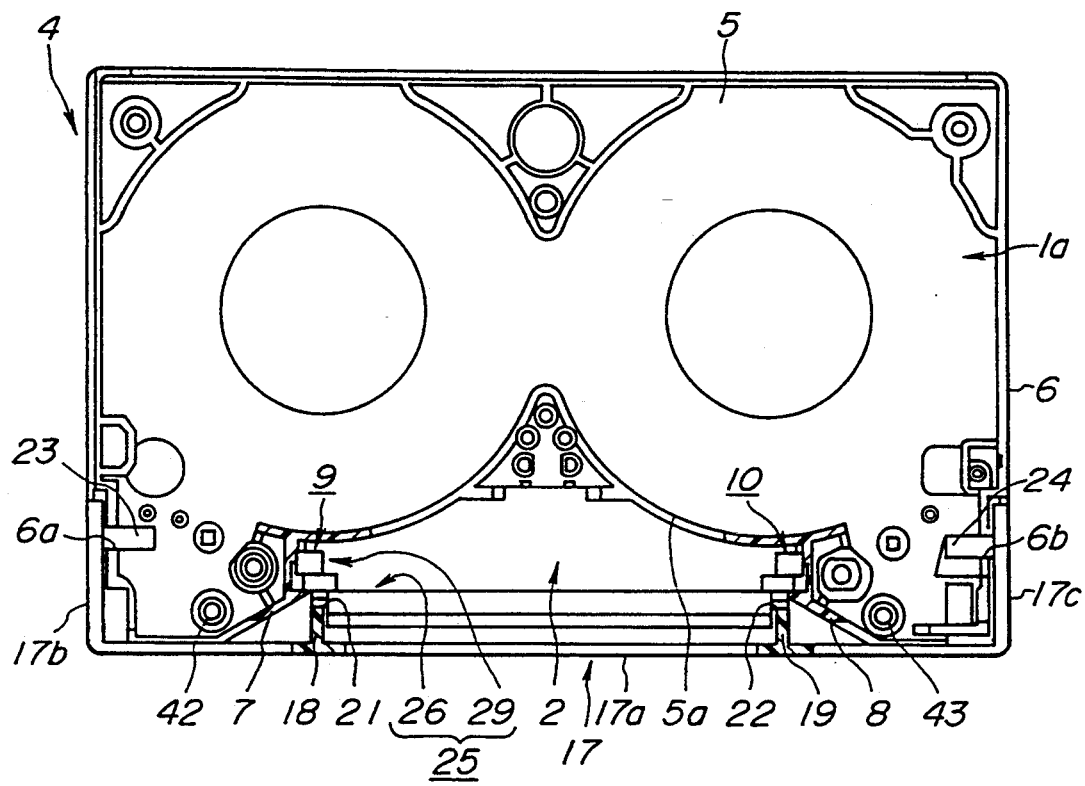
FIG. 2A is a horizontal sectional view of the tape cassette shown in FIG. 1A.

The lower shell 4, as shown in FIG. 2A, includes a bottom (or bottom plate) 5 defining a rectangular lower surface of the, case 1, and a lower upright wall 6 including a rear wall portion defining a lower half of the rear surface of the case 1, and right and left side wall portions defining lower halves of the right and left side surfaces of the case 1. The bottom 5 and the upright wall 6 of this example are integral parts of the lower shell 4. The wall 6 extends along the rear and left and right ends of the bottom 5 like a raised edge or rim of a tray. The bottom 5 is formed with a lower partition 5a separating the reel chamber 1a and the front opening 2. Each of the left and right side wall portions of the upright wall 6 is formed with a cutout 6a or 6b which forms a pin hole with a corresponding cut portion formed in the upper half 3, as shown in FIG. 1A.

The lower shell 4 further includes right and left upright front walls 7 and 8 which project upright from the bottom 5, like the upright wall 6. The front walls 7 and 8 are located at and near the front end of the bottom 5 between the right and left side wall portions of the upright wall 6, and spaced from each other by the front opening 2. As shown in FIG. 2A, the front walls and 8 extend inward and reach the right and left end portions of the partition 5a, respectively.

Figure 2B:
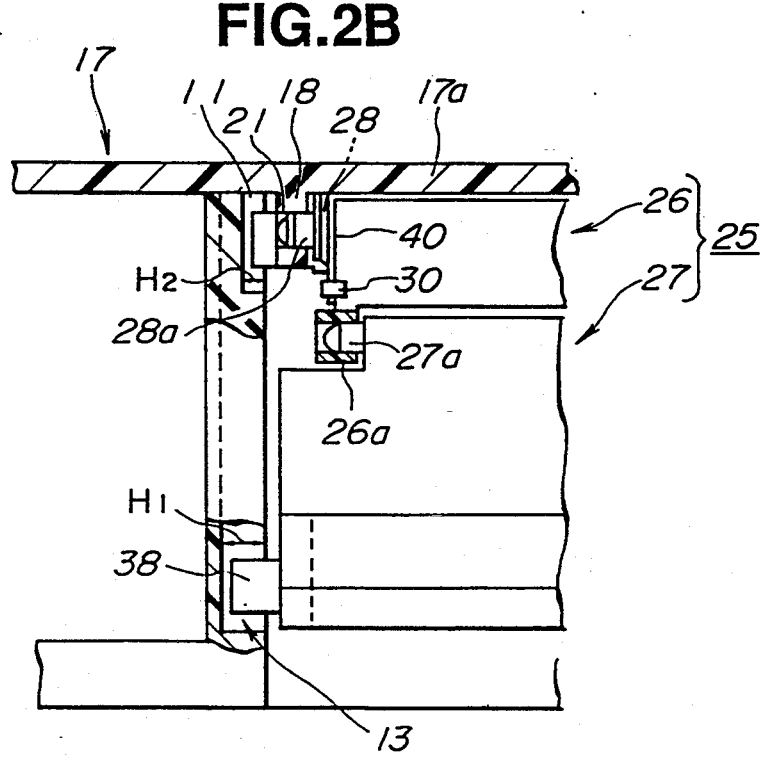
FIG. 2B is a sectional view showing portions of front and back lids and a ease of the cassette of FIG. 1A.
Figure 3:
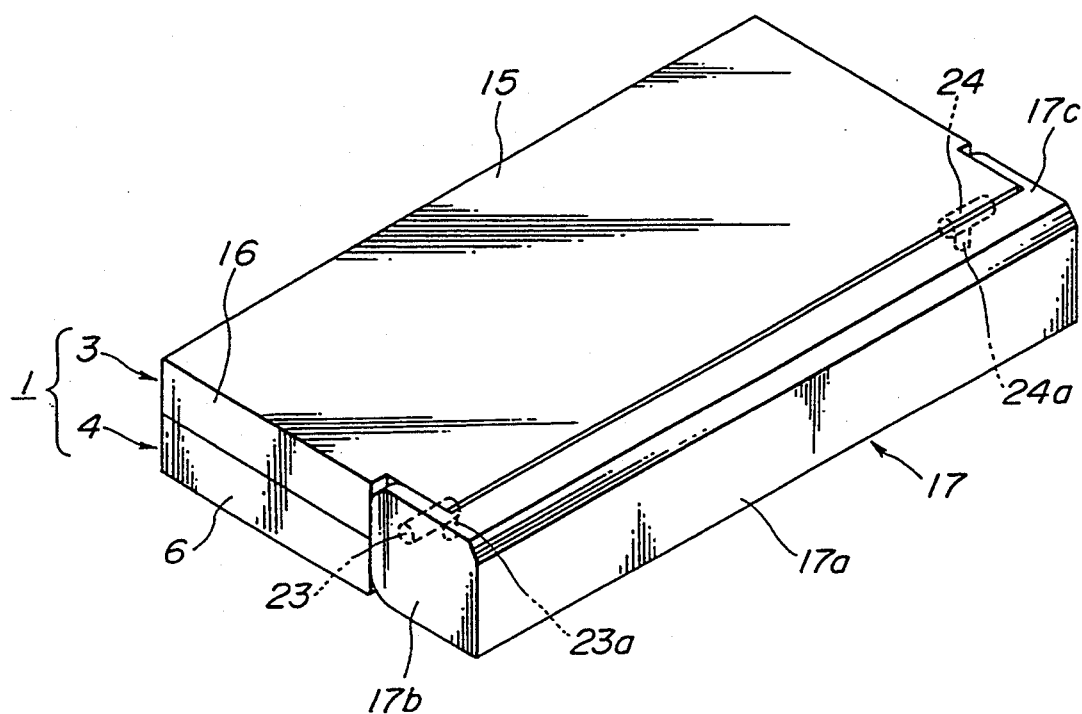
FIG. 3 is a perspective view showing the whole of the tape cassette according to the first embodiment of the present invention.

Each of the front walls 7 and 8 has an inner wall portion formed with a cam arrangement 9 or 10. The inner wall portions of the right and left front walls 7 and 8 confront each other along the right and left widthwise direction of the cassette. The inner wall portion on each side has an inward flat wall surface which is vertical and parallel to the front and rear direction of the case 1. The cam arrangements 9 and 10 open in the front opening 2 toward each other along the widthwise direction of the cassette. Each of the cam arrangements 9 and 10 includes a recess 11 or 12 having a first cam surface 11a or 12a, and a guide groove 13 or 14 having a pair of second cam surfaces 13a or 14a. The guide groove 13 or 14 on each side extends from a lower end "b", to an upper end "a" which opens into the corresponding recess 11 or 12. Each of the second cam surfaces 13a and 14a is a curved surface which winds gently and Slowly from the lower end "b" to the upper groove end "a" approximately like the shape of an S. Each guide groove 13 or 14 is formed between two of the second cam surfaces 13a or 14a confronting each other. The recess 11 or 12 and the guide arrangement 13 or 14 of each cam groove 9 or 10 both open upwards (along the vertical direction of the cassette). In each cam arrangement 9 or 10, the recess 11 or 12 is wider than the guide groove 13 or 14. The depth $H_1$ of the guide grooves 13 and 14 is greater than the depth $H_2$ of the recesses 11 and 12, as shown in FIGS. 1B and 2B. The open width $L_1$ of the guide grooves 13 and 14 is smaller than the open width $L_2$ of the recesses 11 and 12. The width of each guide groove 13 or 14 is defined between the confronting second cam surfaces 13a or 14a.

The upper shell 3 of the tape case 1 includes a flat top (or ceiling plate) 15 defining a rectangular upper surface of the case 1 and an upper upright wall 16 including a rear wall portion defining an upper half of the rear surface of the case 1, and right and left side wall portions defining upper halves of the right and left side surfaces of the case 1. The wall 16 extends along the right end, the rear end and the left end of the rectangular top 15 like a raised edge of a tray. The top 15 is formed with an upper partition 16a for abutting on the lower partition 5a of the lower shell 2. One end of each of return springs S (only one is shown) is retained by a depression formed in the underside of the top 15 of the upper shell 3. At least one reel pressing spring (not shown) for pressing a tape reel to the bottom plate 5 is attached to the top plate 15.

The tape cassette further includes a front lid 17 for covering and protecting the front side of the tape T. The front lid 17 has a front plate 17a which is shaped like an inverted L, and which has a front portion for closing the front side of the front opening 2, and an upper portion projecting rearwards from the upper end of the front portion like a flange. In the back side of the front plate 17a, there is formed a recessed corner s formed between the upper portion and the front portion. The front lid 17 further includes right and left side plates 17b and 17c projecting rearwards from the right and left ends of the front plate 17a, respectively, in parallel to each other. The front lid 17 is swingably mounted on the front portion of the case 1 through the side plates 17b and 17c. In this example, the front plate 17a and the side plates 17b and 17c are all integral parts of the front lid 17.

Right and left support portions 18 and 19 are formed in the back side of the front lid 17. Each support portion 18 or 19 projects vertically from the upper end of the back side of the front plate 17a. Each of the support portions 18 and 19 is formed with a pin hole 21 or 22 opening laterally. The front plate 17a has a lower flange 20 for covering the lower end of the tape T. The lower flange 20 projects backward from the lower end of the front plate 17, and extends in the cassette widthwise direction.

Each of the side plates 17b and 17c of the front lid 17 is integrally formed with a pivot pin 23 or 24 and a spring retainer 23a or 24a for retaining the other end of the corresponding return spring S. The pivot pins 23 and 24 project inwardly toward each other along the cassette widthwise direction. The pivot pins 23 and 24 of the front lid 17 are received in the pin holes 6a and 6b of the case 1, respectively. The return springs S disposed between the front lid 17 and the case 1 always urge the front lid 17 in the closing direction toward the closed position of the front lid 17.

Figure 4:
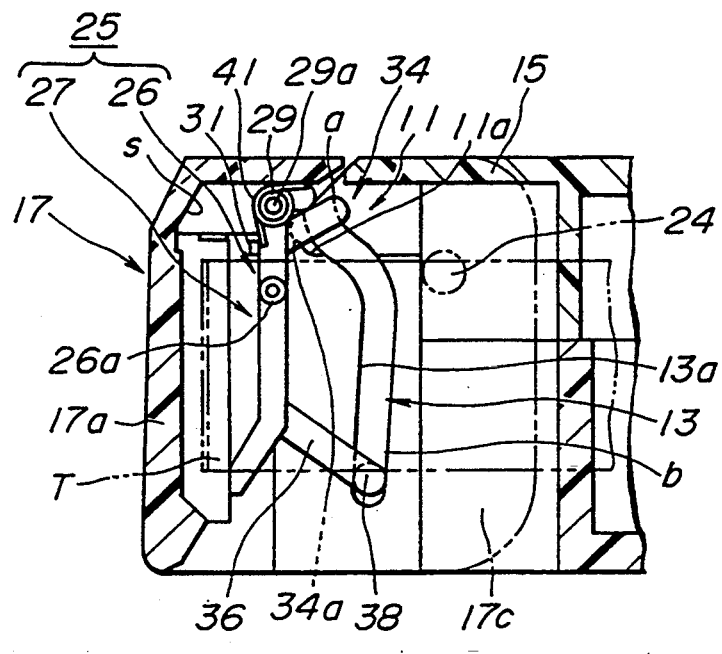
FIGS. 4-9 are similar sectional views of the tape cassette of FIG. 1A showing successive phases in a lid opening operation from the closed state of FIG. 4 to the opened state of FIG. 9.

The tape cassette further includes a back lid 25 for covering and protecting the back side of the tape T. The back lid 25 is swingably mounted on the front lid 17 and the case 1. In the closed state, the lower end of the back lid 25 is close to the lower flange 20 of the front lid 17 (FIG. 4).

The back lid 25 is composed of hingedly connected first and second swing plates 26 and 27. The first plate 26 is generally flat and approximately rectangular in section. The second plate 27 extends from an upper edge to a lower edge, and is bent at an intermediate point closer to the lower edge. The second swing plate 27 has an upper generally flat portion extending rectilinearly from the upper edge to the intermediate point, and a lower generally flat portion extending rectilinearly from the intermediate point to the lower edge. The upper edge of the second swing plate 27 is pivotally connected with the lower edge of the first swing plate 26 by a pair of hinges 26a and 27a. The hinges 26a and 27a of the back lid 25 are received in the back side recessed corner s of the front lid 17. Each of the first and second swing plates 26 and 27 of the back lid 25 is connected with the front lid 17 and the case 1.

The first swing plate 26 is integrally formed, at its opposite ends, with projections 28 and 29 having pivot pins 28a and 29a extending into the pin holes 21 and 22, respectively, and spring retaining pieces 30 and 31 projecting in the widthwise direction of the cassette. The first swing plate 26 is integrally formed with motion regulating arms 32 and 33 projecting rearward from opposite ends of plate 26. The end of each arm 32 or 33 is integrally formed with a first engagement member (slider) 34 or 35 which is received in the recess 11 or 12, and engages with the first cam surface 11a or 12a. Each of the first engagement members 34 and 35 has an engagement circumferential surface 34a or 35a which, for example, is a circular arc surface obtained by cutting a part (two positions) of the periphery of a pivot pin (not shown) which is circular in section, through a plane containing the axis. Each of the engagement circumferential surfaces 34a and 35a may comprise a cylindrical surface whose section is semicircular.

The second swing plate 27 is integrally formed, at its opposite ends, with motion regulating arms 36 and 37 projecting rearward from an angled portion 27a at which the upper and lower flat portions of the second plate 27 meet. The end of each arm 36 or 37 is integrally formed with a second engagement member (slider) 38 or 39 which is received in the guide groove 13 or 14 and engages with the second cam surfaces 13a or 14a. Each of the second engagement members 38 and 39 is in the form of a pivot pin which is circular in section.

Torsion springs 40 and 41 are arranged to urge the first swing plate 26 in the lid opening direction. A coil portion of each spring 40 or 41 is mounted on the projection 28 or 29 of the first swing plate 26. Ends of each spring 40 or 41 are retained by the spring retaining piece 30 or 31 of the first swing plate 26 and the recessed corner s of the front lid 17, respectively.

The cassette further has tape guides 42 and 43 at opposite sides of the opening 2. The tape T is stretched between the tape guides 42 and 43.

In the thus-constructed tape cassette, tape loading is performed when the cassette is inserted in a video tape recorder (not shown). When the tape cassette is loaded in the video tape recorder, the front lid 17 and the back lid 25 open, and a tape loading guide (not shown) moves into the front opening 2 from the under side of the case 1. Then, the tape loading guide draws out the tape T for the tape loading by moving out of the front opening 2 of the case 1.

In this case, an opening lever (not shown) pushes the front lid 17 upward from below, and by so doing, the opening lever applies a rotational force to each of the front and back lids 17 and 25.

During the lid opening operation, the front lid 17 is rotated, and the back lid 25 is swung, as sequentially illustrated in FIGS. 4–9. These figures show only one of the right and left lateral sides which are substantially symmetrical so that each is substantially a mirror image of the other.

(1) The tape cassette in its closed state shown in FIG. 4 is inserted into the video tape recorder (not shown). In such closed state, the front and back lids 17 and 25 are located at the respective closed positions so as to cover the front and rear sides of the tape T. The tape T is placed and protected between the front and back lids 17 and 25. The first engagement member 34 abuts on (or is engaged with) the first cam surface 11a of the recess 11, and the second engagement member 38 is between the second cam surfaces 13a of the guide groove 13 at the lower end "b" of the guide groove 13. By reason of the engagement of cam followers or engagement members 34 and 38 with the cam surfaces 11a and 13a, the first swing plate 26 of the back lid 25 extends downwardly from the pivot axis defined by pivot pins 28a and 29a and the second swing plate 27 depends downwardly from the swing plate 26 substantially co-planar with the latter.

Figure 5:
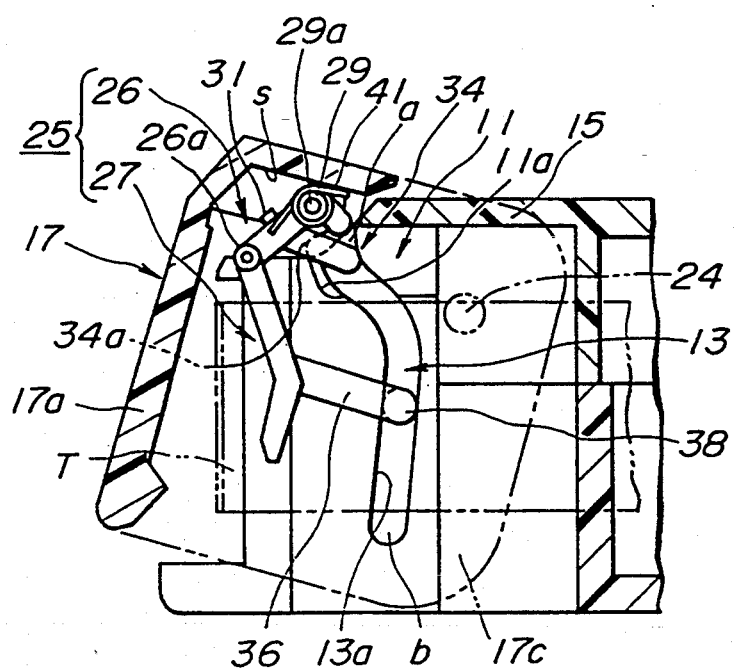

(2) When the tape cassette in the video tape recorder is moved to the cassette loading position, the opening lever of the video tape recorder (not shown) rotates the front lid 17 in the lid opening direction, that is, the clockwise direction as viewed in FIG. 5, about the pivot pin 24 (whose axis is a stationary pivot axis) against the resilient force of the torsion spring (not shown), as shown in FIG. 5. In response to this rotational movement of the front lid 17, the first swing plate 26 swings about the pivot pin 29a (whose axis is a first movable pivot axis) in the direction toward the front lid 17, that is, the clockwise direction relative to the lid 17, by the resilient force of the torsion spring 41, and the second swing plate 27 swings in the direction to move away from the front lid 17, that is, the counterclockwise direction relative to the front lid 17 and also relative to the first swing plate 26, about the hinge 26a. During this, the first engagement member 34 moves upward along the first cam surface 11a sloping upward toward the front until the first engagement member 34 is partly exposed above the cassette (out of the recess 11), and the second engagement member 38 moves upward along a lower groove section of the guide groove 13 between the second cam surfaces 13a. The lower groove section of the guide groove 13 extends from the lower groove end "b" in an oblique direction between the upward direction and the rearward direction.

Figure 6:
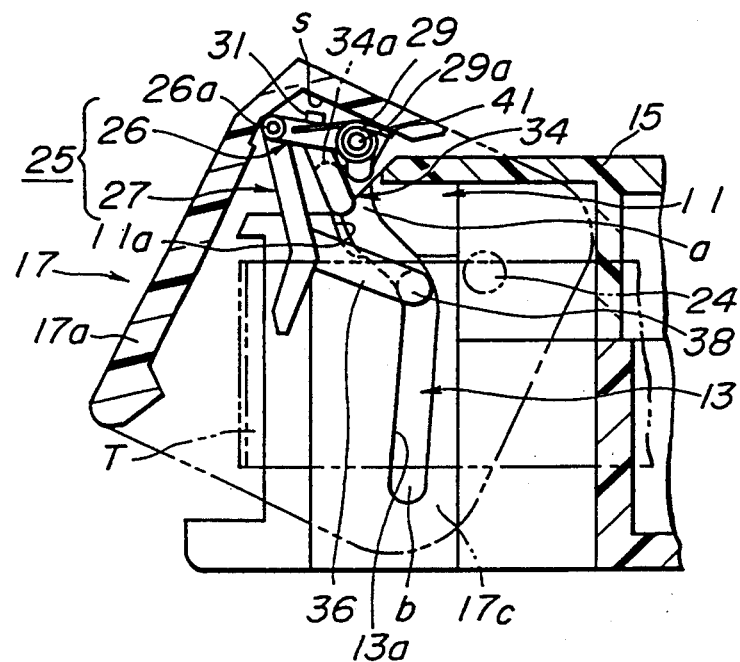

(3) When, as shown in FIG. 6, the opening lever gives the rotation force to the front lid 17 in the lid opening direction from the state shown in FIG. 5, the first swing plate 26 of the back lid 25 swings about the pivot pin 29a in the direction approaching the front lid 17 by the resilient force of the torsion spring 41 until the hinge 26a abuts on the bottom surface of the recessed corner s of the front lid 17, and the second swing plate 27 swings slightly in the direction approaching the front lid 17 about the hinge 26a. During this, the first engagement member 34 moves up entirely out of the recess 11, and the second engagement member 38 moves upward between the second cam surfaces 13a along the lower groove section and an upper groove section of the guide groove 13. The upper groove section extends continuously from the upper end of the lower groove section in an oblique direction lying between the upward direction and the forward direction.

Figure 7:
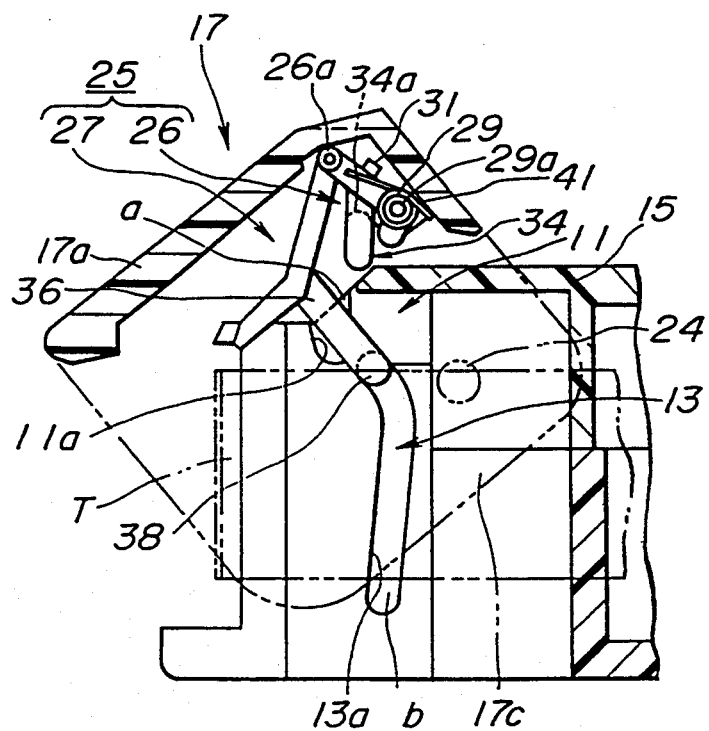

(4) When, as shown in FIG. 7, the opening lever further rotates the front lid 17 from the state of FIG. 6 in the lid opening direction, the first swing plate 26 of the back lid 25 swings about the pivot pin 24 in the same direction along with the rotational movement of the front lid 17, and the second swing plate 27 swings about the hinge 26a in the direction (the lid opening direction) approaching the front lid 17, thereby avoiding interference with the tape T. During this, the first engagement member 34 travels along an arcuate course around the pivot pin 24, and the second engagement member 38 moves upward in the upper groove section of the guide groove 13 between the second cam surfaces 13a. During this movement, the first swing plate 26 with the first engagement member 34 remains stationary relative to the front lid 17 and rotates with the front lid 17 as a unit about the pivot pin 24. The second swing plate 27 moves relative to the front lid 17 and the lower end of the second swing plate 27 further slightly approaches the front lid 17.

Figure 8:
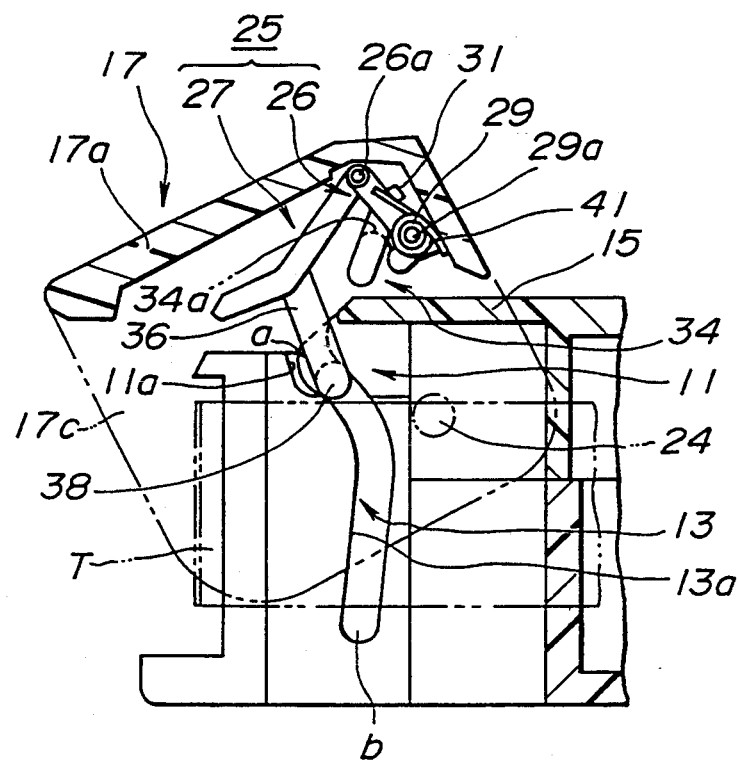

(5) When the front lid 17 is further rotated in the lid opening direction from the state of FIG. 7 by the opening lever of the video tape recorder, as shown in FIG. 8, the first swing plate 26 swings about the pivot pin 24 in the same direction together with the front lid 17, and the second swing plate 27 swings about the hinge 26a in the (lid opening) direction approaching the front lid 17. During this, the first engagement member 34 travels along the swinging course around the pivot pin 24, and the second engagement member 38 moves upward in the upper groove section of the guide groove 13 until the upper groove end "a" is reached.

Figure 9:
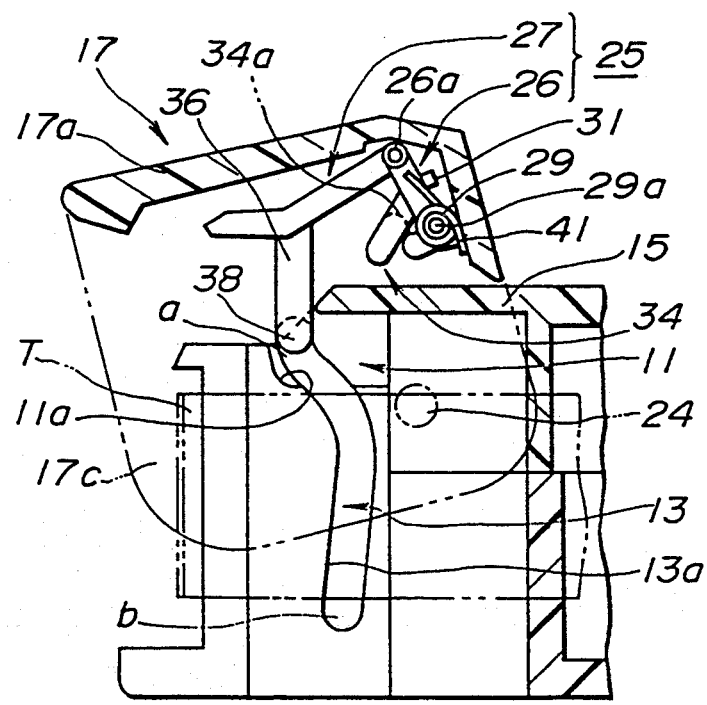

(6) When the front lid 17 is further rotated in the lid opening direction from the state of FIG. 8 by the opening lever of the video tape recorder, as shown in FIG. 9, the first swing plate 26 of the back lid 25 rotates about the pivot pin 24 in the same direction together with the front lid 17, and the second swing plate 27 swings about the hinge 26a in the (lid opening) direction approaching the front lid 17. During this, the first engagement member 34 travels along the swinging course around the pivot pin 24, and the second engagement member 38 moves upward from the upper groove end "a" to a point almost outside the cassette.

In this way, the front lid 17 can be rotated, and the back lid 25 can be swung open. The front lid 17 and the back lid 25 can be closed in the manner opposite to the movements described above in the paragraphs numbered (1) through (6).

It will be apparent from FIGS. 4–9 that, in the closed state (FIG. 4) the hingedly connected plates 26 and 27, which comprise the back lid 25, are substantially co-planar, at least adjacent their contiguous edges so as to shield the back surface of the tape T positioned between the front and back lids 17 and 25. However, during movement of the front lid 17 toward its opened state, the first swing plate 26 is turned clockwise, as viewed in FIGS. 4–9) more rapidly than the front lid 17, while the second swing plate 27 is lifted relative to the front lid and turned counter-clockwise relative to the swing plate 26 so as to be folded relative to the latter for clearing the top edge of the tape without requiring excessive rotation of the front lid 17, as is clearly shown on FIGS. 6 and 7. During the final movement of the front lid 17 to its opened state (FIG. 9), the relative folding of the first and second swing plates 26 and 27 of the back lid 25 is made less acute, that is, the second swing plate 27 is moved toward the front part 17a of the front lid so as to raise the free edge of plate 27 well clear of the tape T.

In this practical example, therefore, it is possible to add the back lid behind the front lid 17 without changing the currently employed opening angle, so that the tape T can be protected more efficiently. In this practical example, the back lid 25 is inserted without changing the rotational angle of the front lid 17. This practical example does not require change of design except for the addition of the back lid 25.

The present invention is not limited to the above-mentioned practical example, but is also applicable to tape cassettes shown in FIGS. 10A~13B. When a member shown in these figures has an identical or equivalent member in FIGS. 1A~9, it is given the same reference numeral, and a detailed explanation is omitted. The lids moves approximately in the same manner as in the preceding example, and accordingly no explanation is made on the movements of the lids.

Figure 10A:
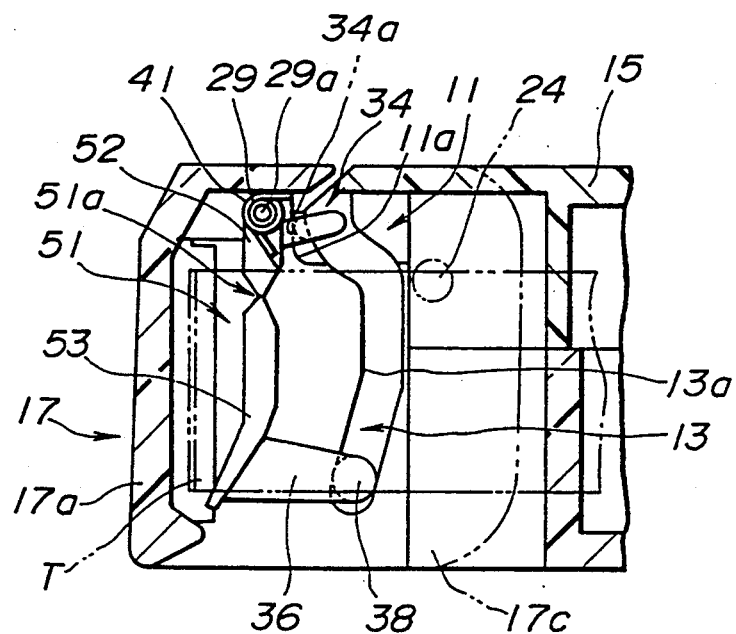
FIG. 10A is a sectional view similar to FIG. 4, but showing a cassette according to a second embodiment of the present invention in the closed state.
Figure 10B:
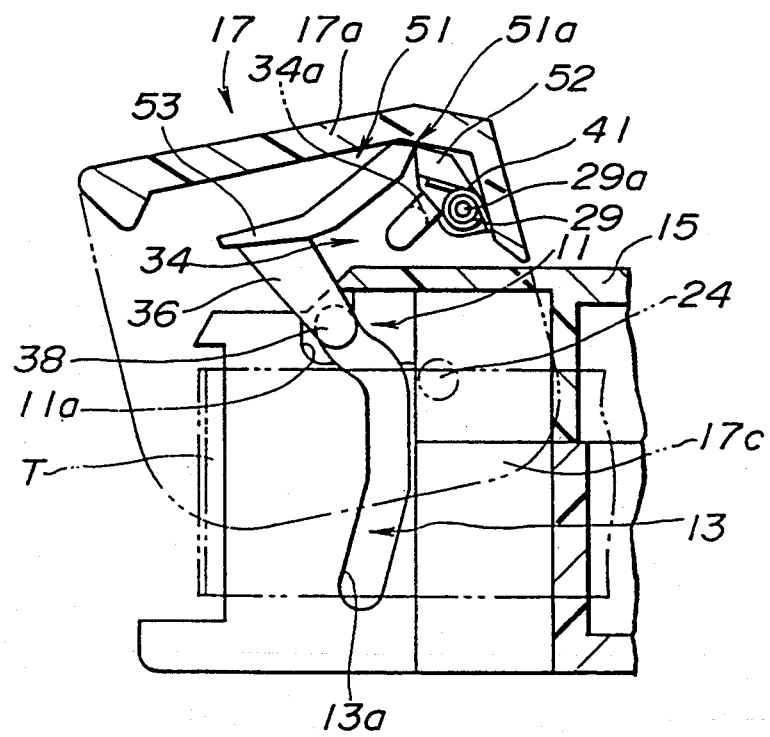
FIG. 10B is a sectional view showing the second embodiment in the open state.

FIGS. 10A and 10B show a second example of the present invention. A back lid 51 of this example is a single integral member made of resin. The back lid 51 has a first swing plate (portion) 52 and a second swing plate (portion) 53 which is hingedly joined to the swing plate or portion 52. The first and second swing plates 52 and 53 are continuous with each other through a neck 51a, which is thin enough to allow the back lid 51 to bend at the neck 51a and to allow each of the first and second plates 52 and 53 to swing on a line passing through the neck 51a along the cassette widthwise direction. In this example, the first and second plates 52 and 53 and the neck 51a are all integral parts of the jointless single resin member.

Figure 11A:
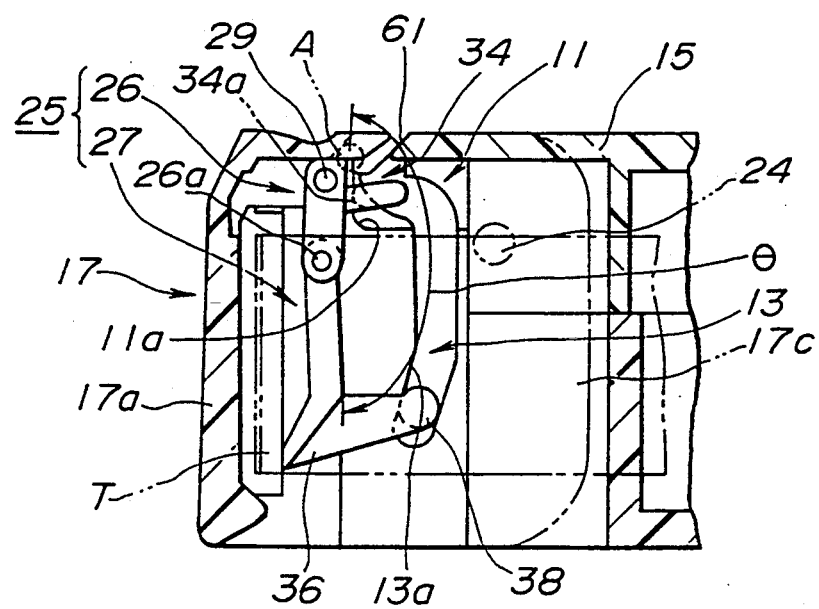
FIG. 11A is a sectional view showing a cassette according to a third embodiment of the present invention in the closed state.
Figure 11B:
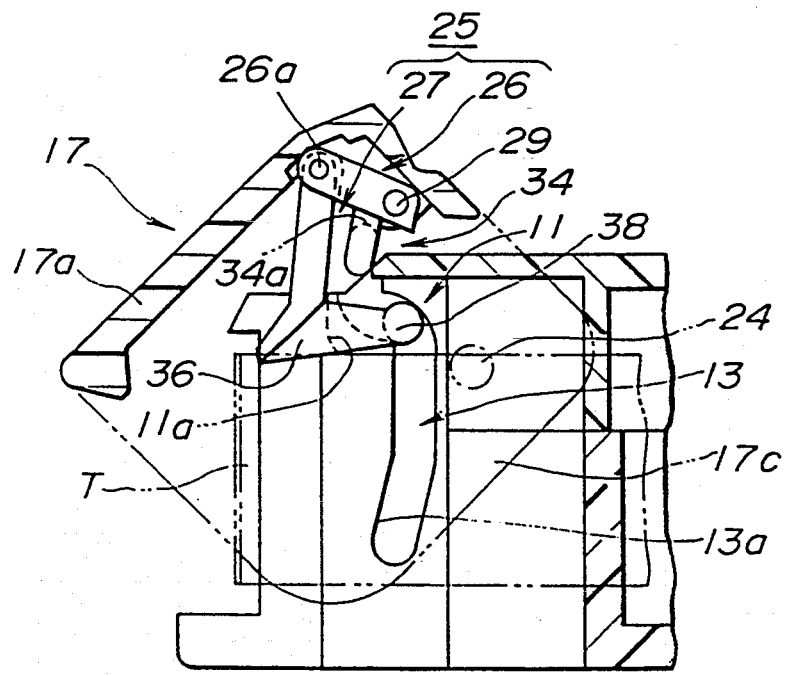
FIG. 11B is a sectional view showing the third embodiment in the partly open state.
Figure 11C:
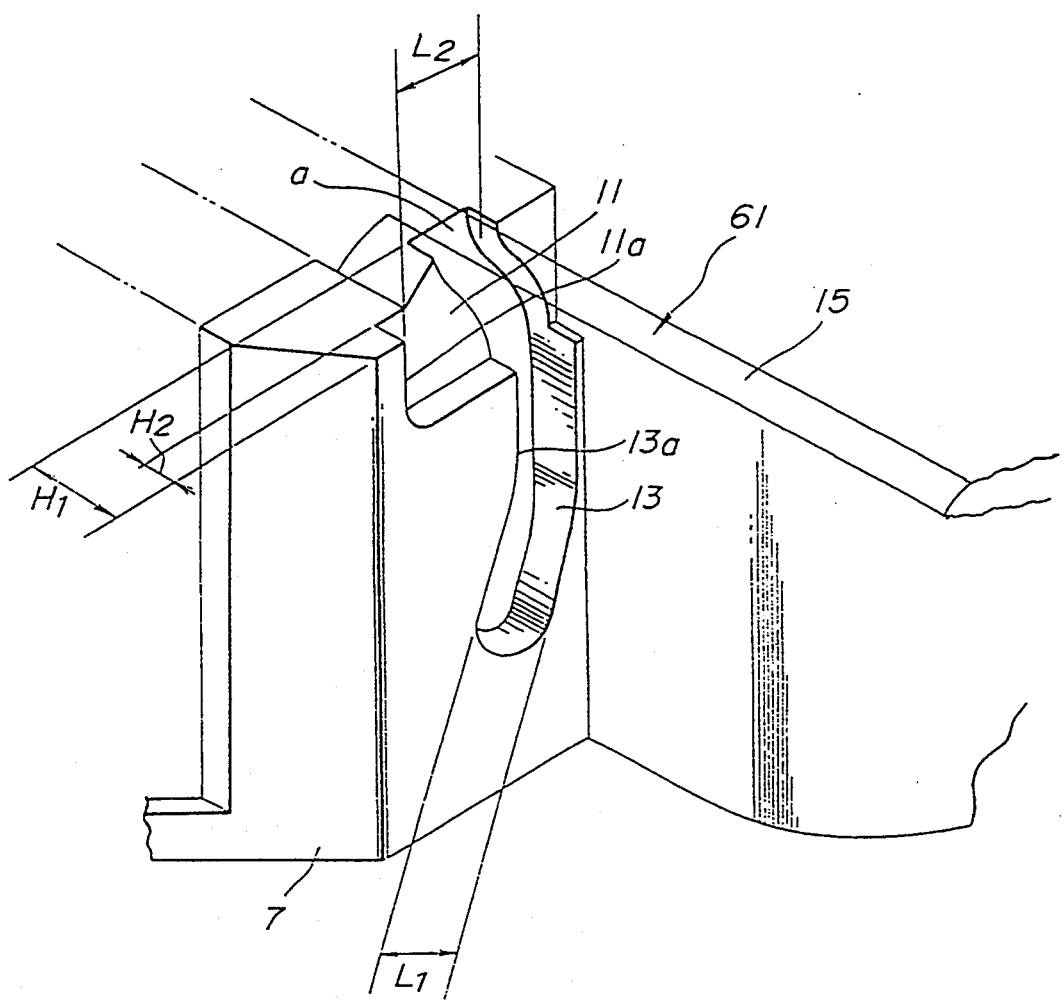
FIG. 11C is a perspective view showing one of the came arrangements formed in the cassette of the third embodiment.

FIGS. 11A, 11B and 11C show a third example according to the present invention. The top plate 15 of the upper shell 3 of the case 1 has a front end which is formed with guide surfaces 61 (only one is shown). The guide surface 61 shown in these figures is formed in the top plate 15, and connected with the first cam surface 11a (or 12a). In the lid closed state, the back lid 25 is held in the state in which the upper edge of the first swing plate 26 of the back lid 25 abuts against the under side of the front lid 17 at a point A, and the cassette back lid 25 is bent like a dogleg to the opposite side to the front lid 17, (that is, toward the rear of the cassette), so that the angle θ shown in FIG. 11a is less than 180°.

Figure 12A:
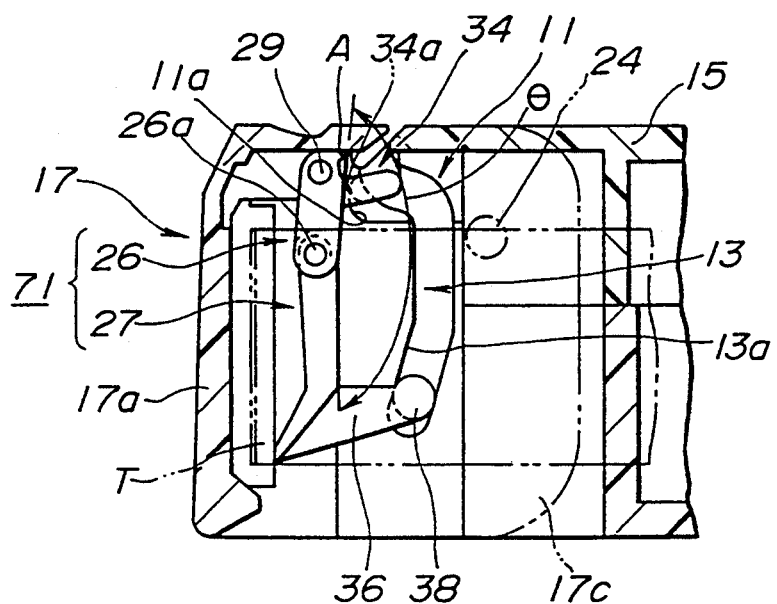
FIG. 12A is a sectional view showing a cassette according to a fourth embodiment of the present invention in the closed state.
Figure 12B:
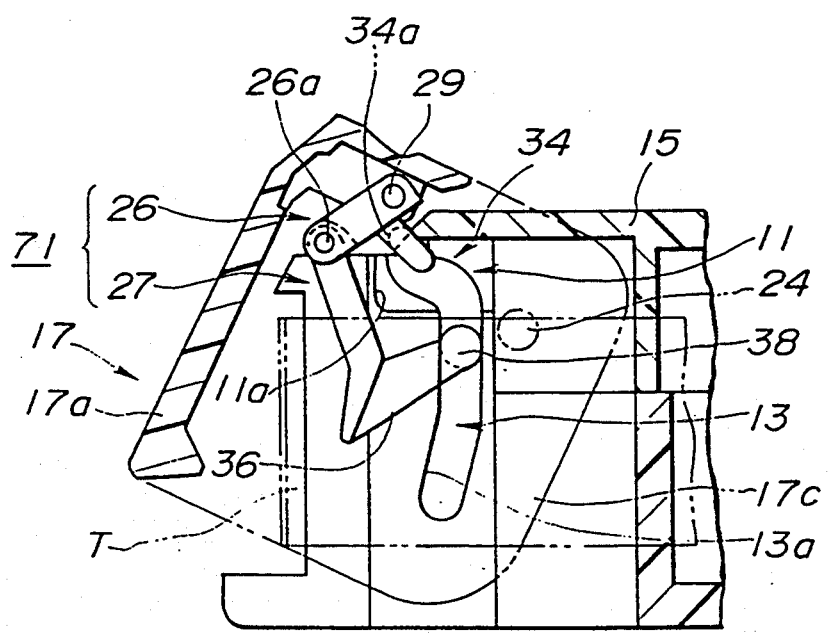
FIG. 12B is a sectional view showing the fourth embodiment in the partly open state.

FIGS. 12A and 12B show a fourth example according to the present invention. In the lid closed state, a back lid 71 of this example is again held in the state in which the upper end of the first swing plate 26 of the back lid 71 abuts against the under side of the front lid 17 at a point A, and the cassette back lid 71 is bent like a dogleg to the opposite side to the front lid 17 (toward the rear of the cassette). The angle θ of this bend in the closed state is set equal to a value which satisfies 160°<θ<179°. This arrangement makes smooth the lid opening operation of the back lid 71, and eliminates the need for the springs 40 and 41.

Figure 13A:
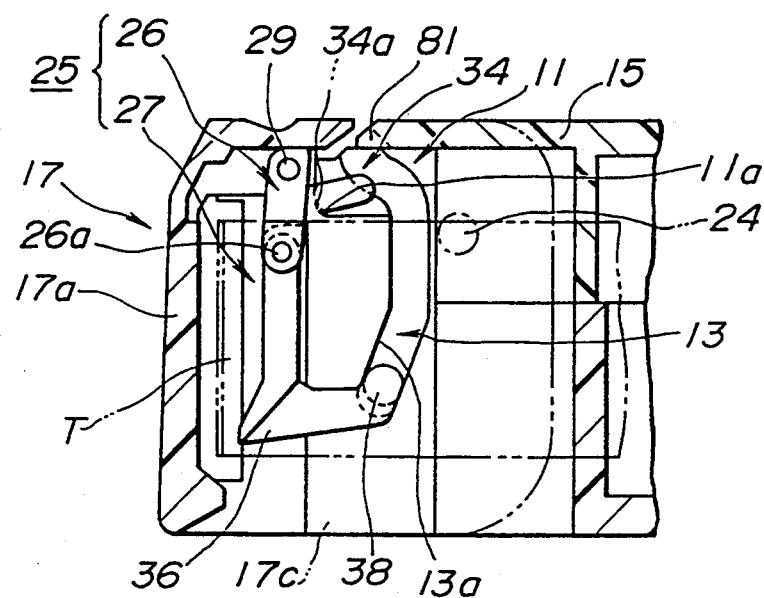
FIG. 13A is a sectional view showing a cassette according to a fifth embodiment of the present invention in the closed state.
Figure 13B:
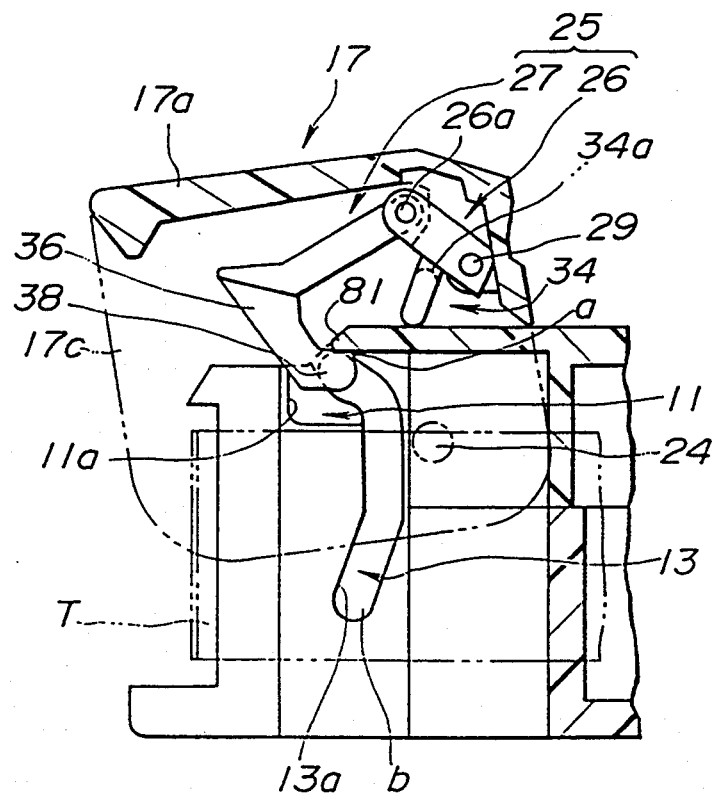
FIG. 13B is a sectional view showing the fifth embodiment in the open state.

FIGS. 13A and 13B show a fifth example according to the present invention. The top plate 15 of the case 1 is formed with stoppers 81 (only one is shown) for limiting the upward movement of the second engagement member 38. Each stopper 81 is formed near the upper end of the respective one of the second cam surfaces 13a. This stopper 81 prevents the second engagement member 38 from slipping of the guide groove 13, and stabilizes the opening and closing operations of the back lid 25. The stopper 81 may be formed so as to close the entirety of the upper end "a" of the guide groove 13.

In the above examples, the present invention is applied to a tape cassette for a video tape recorder. However, the present invention is not limited to this. The present invention is applicable similarly to tape cassettes for various other record reproducing equipment and information processing equipment.

What is claimed is:

1. A tape cassette comprising:

a case for containing a tape and including a front side having a front opening therein, and tape guide means for guiding the tape in a straight tape path extending across said front opening;

a front lid mounted on said case for pivotal movements relative thereto about a first axis which is fixed in respect to said case and extends parallel to said straight tape path, said front lid being pivotally movable about said first axis between a closed position for covering said front opening in front of straight said tape path and a raised opened position for exposing said front opening and the front of the tape in said straight tape path; a back lid including first and second elongated, substantially rectangular plate members each having two opposed longitudinal edges, means mounting said first plate member on said front lid for pivotal movements relative to said front lid about a second axis which is parallel to said first axis and extends along one of said two longitudinal edges of said first plate member, and means hingedly connecting said first and second plate members to each other for swinging movements of said second plate member relative to said first plate member about a third axis which is also parallel to said first axis and extends along the other of said two longitudinal edges of the first plate member and one of said two longitudinal edges of said second plate member; and cam means for separately controlling said pivotal movements of said first plate member relative to said front lid and said swinging movements of said second plate member relative to said first plate member in response to said pivotal movements of the front lid between said closed and opened positions thereof so that, with said front lid in said closed position, said first plate member depends from said second axis and said second plate member depends from said third axis for disposing said back lid behind said straight tape path to enclose the tape in said straight tape path between said front and back lids and, during pivotal movement of said front lid about said first axis in a first direction from said closed position toward said opened position, said first plate member is pivotally moved in said first direction about said second axis relative to said front lid so as to raise said third axis relative to said front lid while said second plate member is initially swingably moved about said third axis relative to said front lid in a second direction counter to said first direction for ensuring that the other of said two longitudinal edges of said second plate member clears the top edge of said tape in the straight tape path and, during a final increment of said pivotal movement of said front lid to said opened position, said second plate member is swingably moved about said third axis in said first direction relative to said front lid for disposing said other longitudinal edge of said second plate member adjacent to said front lid.

2. A tape cassette according to claim 1; in which said cam means includes first cam surfaces on said case, first cam follower means on said first plate member engageable with said first cam surfaces for controlling said pivotal movements of said first plate member relative to said front lid, second cam surfaces on said case, and second cam follower means on said second plate member engageable with said second cam surfaces for controlling said swinging movements of said second plate member relative to said first plate member.

3. A tape cassette according to claim 2; in which said case has interior side wall portions facing toward each other in back of said straight tape path and respectively disposed adjacent opposite ends of said back lid; and in which said interior side wall portions have respective recesses in upper parts thereof for defining said first cam surfaces and respective grooves extending downwardly from the respective recesses for defining said second cam surfaces.

4. A tape cassette according to claim 3; in which said case has a top wall with a front edge which is adjacent said front lid in said closed position of the latter, and said front edge of the top wall has portions forming guide surfaces which are contiguous with said first cam surfaces defined by said recesses and which are also engageable, by said first cam follower means for controlling said pivotal movements of said first plate member relative to said front lid.

5. A tape cassette according to claim 3; in which each of said grooves has a depth in the respective one of said side wall portions of the case greater than the depth of the respective recess in said one side wall portion; and in which said first cam follower means includes first follower elements projecting relatively small distances beyond ends of said first plate member into said respective recesses, and said second cam follower means include second follower elements projecting relatively larger distances beyond ends of said second plate member into said respective grooves.

6. A tape cassette according to claim 1; in which said means hingedly connecting said first and second plate members includes pivot pins extending from opposed ends of one of said plate members, and means at the opposed ends of the other of said plate members defining holes rotatably receiving said pivot pins at the respective ends of said one of the plate members.

7. A tape cassette according to claim 1; in which said back lid is a single molded plastic element and said means hingedly connecting said first and second plate members is comprised of a web between said plate members which is of reduced thickness so as to be bendable for permitting said swinging movements of said second plate member relative to said first plate member about said third axis.

8. A tape cassette according to claim 1; in which said front lid includes a front portion substantially parallel to said tape in said straight tape path when said front lid is in said closed position and an upper flange-like portion directed rearwardly from an upper edge of said front portion and cooperating with the latter to define a corner therebetween which receives the hingedly connected longitudinal edges of said first and second plate members when said front lid is moved to said opened position.

9. A tape cassette according to claim 1; in which said first and second plate members of the back lid are substantially co-planar at least adjacent the hingedly connected longitudinal edges thereof when said front lid is in said closed position; and further comprising spring means connected between said front lid and said first plate member for urging the latter to pivot relative to said front lid about said second axis in said first direction as said front lid leaves said closed position in said first direction.

10. A tape cassette according to claim 1; in which said front lid and said first plate member of the back lid have cooperatively engageable means thereon for limiting said pivotal movements of said first plate member in said second direction relative to said front lid so that, when said front lid is in said closed position thereof, said first and second plate members of the back lid include an angle of less than 180° at the side of the back lid facing away from the front lid.

11. A tape cassette according to claim 1; in which said case has interior side wall portions facing toward each other in back of said straight tape path and respectively disposed adjacent opposite ends of said back lid; said cam means include recesses in upper parts of said interior side wall portions defining first cam surfaces, first cam followers extending from ends of said first plate member and being received in said recesses of the adjacent side wall portions at least when said front lid is in said closed position, respective grooves extending downwardly from said recesses in said side wall portions and defining second cam surfaces, and second cam followers extending from ends of said second-plate member and engaging said second cam surfaces in said grooves of the adjacent interior side wall portions.

12. A tape cassette according to claim 11; in which each of said grooves includes contiguous upper and lower end portions, each of said recesses extends forwardly from said upper end portion of the respective groove toward a plane containing said straight tape path, said lower end portion of each of said grooves slants upwardly away from said plane, and said upper end portion of each of said grooves extends upwardly from the contiguous lower end portion of the respective groove in a direction converging toward said plane.

13. A tape cassette according to claim 12; in which, in said closed position of said front lid, said second axis is disposed between said plane containing the straight tape path and a parallel plane containing said first axis.

* * * * *